(12) United States Patent
Mohareri et al.

(10) Patent No.: US 12,548,159 B2
(45) Date of Patent: Feb. 10, 2026

(54) SCENE PERCEPTION SYSTEMS AND METHODS

(71) Applicant: Intuitive Surgical Operations, Inc., Sunnyvale, CA (US)

(72) Inventors: Omid Mohareri, San Francisco, CA (US); Simon P. DiMaio, San Carlos, CA (US); Zhaoshuo Li, Baltimore, MD (US); Amirreza Shaban, Atlanta, GA (US); Jean-Gabriel Simard, Montreal (CA)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 877 days.

(21) Appl. No.: 17/776,073

(22) PCT Filed: Nov. 13, 2020

(86) PCT No.: PCT/US2020/060567
§ 371 (c)(1),
(2) Date: May 11, 2022

(87) PCT Pub. No.: WO2021/097332
PCT Pub. Date: May 20, 2021

(65) Prior Publication Data
US 2022/0392084 A1    Dec. 8, 2022

Related U.S. Application Data

(60) Provisional application No. 63/017,506, filed on Apr. 29, 2020, provisional application No. 62/936,343, filed on Nov. 15, 2019.

(51) Int. Cl.
*G06T 7/11* (2017.01)
*A61B 34/20* (2016.01)
(Continued)

(52) U.S. Cl.
CPC ............... *G06T 7/11* (2017.01); *A61B 34/20* (2016.02); *G06T 1/0014* (2013.01); *G06T 7/215* (2017.01);
(Continued)

(58) Field of Classification Search
CPC ......... G06T 7/11; G06T 1/0014; G06T 7/215; G06T 7/292; G06T 7/80;
(Continued)

(56) References Cited

U.S. PATENT DOCUMENTS

| | | |
|---|---|---|
| 2014/0303491 A1 | 10/2014 | Shekhar et al. |
| 2018/0064316 A1 | 3/2018 | Charles et al. |

(Continued)

FOREIGN PATENT DOCUMENTS

| | | |
|---|---|---|
| CN | 106937531 A | 7/2017 |
| CN | 107456278 A | 12/2017 |

(Continued)

OTHER PUBLICATIONS

Golodetz, Stuart et.al., "Collaborative Large-Scale Dense 3D Reconstruction with Online Inter-Agent Pose Optimisation," IEEE Transactions on Visualization and Computer Graphics, Jan. 2018, pp. 1-14.

(Continued)

*Primary Examiner* — Ming Y Hon
*Assistant Examiner* — Dominique James

(57) ABSTRACT

Scene perception systems and methods are described herein. In certain illustrative examples, a system combines data sets associated with imaging devices included in a dynamic multi-device architecture and uses the combined data sets to perceive a scene (e.g., a surgical scene) imaged by the imaging devices. To illustrate, the system may access tracking data for imaging devices capturing images of a scene and fuse, based on the tracking data, data sets respectively (Continued)

associated with the imaging devices to generate fused sets of data for the scene. The tracking data may represent a change in a pose of at least one of the image devices that occurs while the imaging devices capture images of the scene. The fused sets of data may represent or be used to generate perceptions of the scene. In certain illustrative examples, scene perception is dynamically optimized using a feedback control loop.

20 Claims, 9 Drawing Sheets

(51) Int. Cl.
    *A61B 90/00*       (2016.01)
    *G06T 1/00*        (2006.01)
    *G06T 7/215*      (2017.01)
    *G06T 7/292*      (2017.01)
    *G06T 7/80*       (2017.01)

(52) U.S. Cl.
    CPC ............... *G06T 7/292* (2017.01); *G06T 7/80* (2017.01); *A61B 2034/2065* (2016.02); *A61B 2090/364* (2016.02); *G06T 2207/20081* (2013.01); *G06T 2207/20221* (2013.01); *G06T 2207/30244* (2013.01)

(58) Field of Classification Search
    CPC . G06T 2207/20081; G06T 2207/20221; G06T 2207/30244; G06T 3/4038; A61B 34/20; A61B 2034/2065; A61B 2090/364; G06F 18/251; G16H 30/40
    See application file for complete search history.

(56) References Cited

U.S. PATENT DOCUMENTS

2019/0184582 A1*   6/2019   Namiki .................. H04N 23/90
2020/0175669 A1*   6/2020   Bian ..................... G06T 7/0004
2020/0289222 A1*   9/2020   Denlinger .............. B25J 9/1664

FOREIGN PATENT DOCUMENTS

CN         108348143 A     7/2018
TW         I639136 B   * 10/2018

OTHER PUBLICATIONS

International Search Report and Written Opinion for Application No. PCT/US2020/060567, mailed Feb. 26, 2021, 11 pages.
Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.
International Preliminary Report on Patentability for Application No. PCT/US2020/060567, mailed May 27, 2022, 8 pages.

* cited by examiner

SCENE PERCEPTION SYSTEMS AND METHODS

RELATED APPLICATIONS

The present application is a U.S. National Stage Application under 35 U.S.C. § 371 of International Application No. PCT/US2020/060567, filed on Nov. 13, 2020, which claims priority to U.S. Provisional Patent Application No. 63/017,506, filed on Apr. 29, 2020, and to U.S. Provisional Patent Application No. 62/936,343, filed on Nov. 15, 2019, the contents of which are hereby incorporated by reference in their entirety.

BACKGROUND INFORMATION

Computer-implemented scene perception typically involves capture and processing of imagery of a scene to determine characteristics of the scene. Conventional scene perception may lack a desired level of accuracy and/or reliability for dynamic and/or complex environments. For example, some objects in a dynamic and complex environment, such as an environment associated with a surgical procedure, may become obstructed from the view of an imaging device.

SUMMARY

The following description presents a simplified summary of one or more aspects of the systems and methods described herein. This summary is not an extensive overview of all contemplated aspects and is intended to neither identify key or critical elements of all aspects nor delineate the scope of any or all aspects. Its sole purpose is to present one or more aspects of the systems and methods described herein as a prelude to the detailed description that is presented below.

An exemplary apparatus includes a memory storing instructions and a processor communicatively coupled to the memory and configured to execute the instructions to: access first tracking data for imaging devices capturing images of a scene; fuse, based on the first tracking data, first data sets respectively associated with the imaging devices to generate a first fused set of data for the scene; access second tracking data for the imaging devices capturing images of the scene, the second tracking data representing a change in a pose of at least one of the image devices that occurs while the imaging devices capture images of the scene; and fuse, based on the second tracking data, second data sets respectively associated with the imaging devices to generate a second fused set of data for the scene.

An exemplary system includes a first imaging device; a second imaging device having a dynamic relationship with the first imaging device based at least on the second imaging device being dynamically moveable relative to the first imaging device during imaging of a scene by the first and second imaging devices; and a processing system communicatively coupled to the imaging devices and configured to access first tracking data for the second imaging device during the imaging of the scene by the first and second imaging devices; fuse, based on the first tracking data, first data sets respectively associated with the first and second imaging devices to generate a first fused set of data for the scene; access second tracking data for the second imaging device during the imaging of the scene by the first and second imaging devices, the second tracking data representing a change in a pose of the second image device that occurs during the imaging of the scene by the first and second imaging devices; and fuse, based on the second tracking data, second data sets respectively associated with the first and second imaging devices to generate a second fused set of data for the scene.

An exemplary method includes accessing, by a processing system, first tracking data for imaging devices capturing images of a scene; fusing, by the processing system based on the first tracking data, first data sets respectively associated with the imaging devices to generate a first fused set of data for the scene; accessing, by the processing system, second tracking data for the imaging devices capturing images of the scene, the second tracking data representing a change in a pose of at least one of the image devices that occurs while the imaging devices capture images of the scene; and fusing, by the processing system based on the second tracking data, second data sets respectively associated with the imaging devices to generate a second fused set of data for the scene.

An exemplary non-transitory computer-readable medium stores instructions executable by a processor to: access first tracking data for imaging devices capturing images of a scene; fuse, based on the first tracking data, first data sets respectively associated with the imaging devices to generate a first fused set of data for the scene; access second tracking data for the imaging devices capturing images of the scene, the second tracking data representing a change in a pose of at least one of the image devices that occurs while the imaging devices capture images of the scene; and fuse, based on the second tracking data, second data sets respectively associated with the imaging devices to generate a second fused set of data for the scene.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
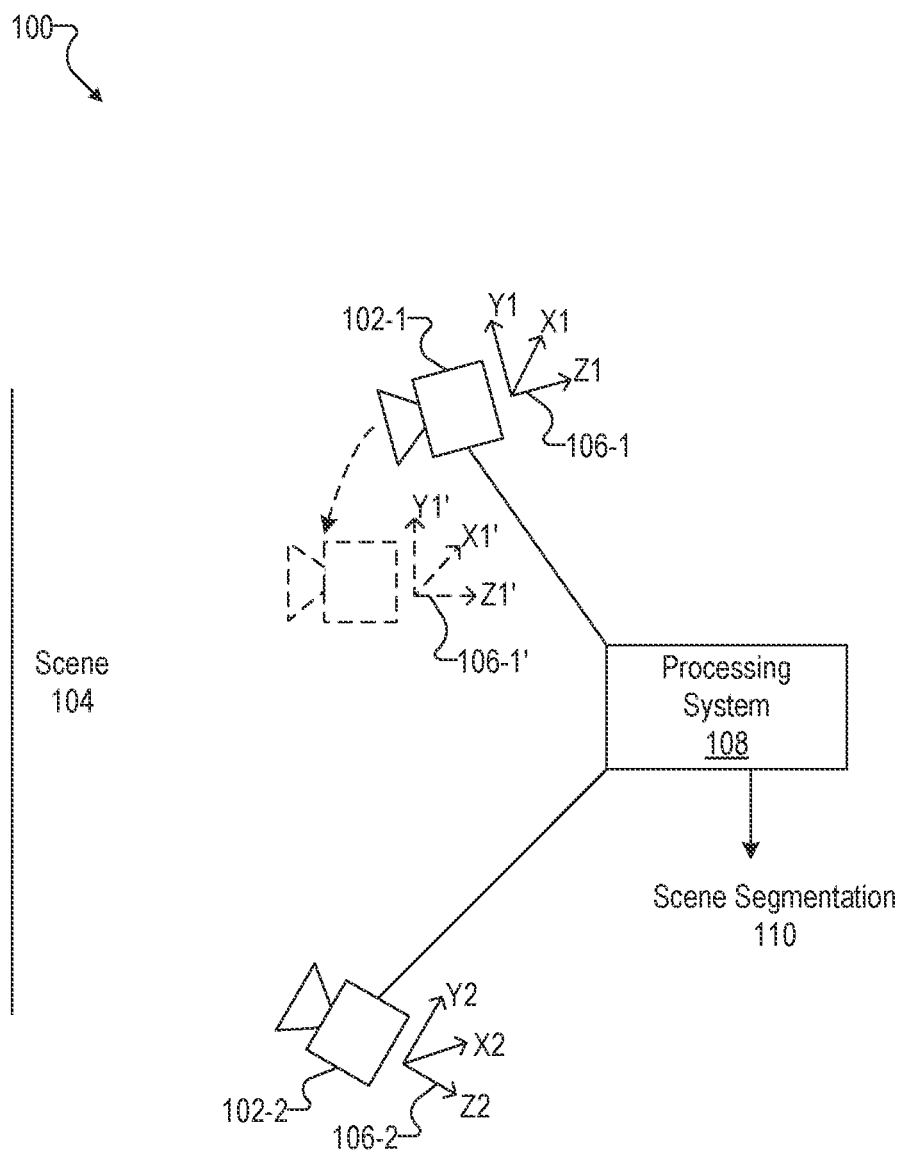
FIG. 1 depicts an illustrative scene perception system according to principles described herein.

Systems and methods for scene perception are described herein. A scene perception system may include multiple imaging devices arranged in a dynamic multi-device architecture and configured to capture imagery of a scene from different viewpoints. The multi-imaging-device architecture is dynamic at least because one or more of the imaging devices may be dynamically moveable in relation to one or more other imaging devices and/or in relation to the scene while the imaging devices are capturing scene imagery for scene perception. This may be referred to as dynamic movement of imaging devices and may include movement of any number of the imaging devices (e.g., movement of one imaging device, movement of two imaging devices, etc.) that results in a change of at least one relationship between imaging devices and/or the scene while the imaging devices are capturing scene imagery for scene perception.

The system may access and use tracking data for the imaging devices for one or more scene perception operations. The tracking data may indicate and/or be used to derive information about one or more of the imaging devices, such as pose information (e.g., position and orientation information) for one or more of the imaging devices. Accordingly, the tracking data may represent dynamic movement of one or more of the imaging devices, such as a change in a pose of one or more of the imaging devices that occurs while the imaging devices capture images of the scene.

In certain illustrative examples, a system may combine data sets associated with imaging devices included in a dynamic multi-device architecture and use the combined data sets to perceive (e.g., segment) a scene imaged by the imaging devices. To illustrate, the system may access first tracking data for imaging devices capturing images of a scene and fuse, based on the first tracking data, first data sets respectively associated with the imaging devices to generate a first fused set of data for the scene. The system may further access second tracking data for the imaging devices capturing images of the scene, which second tracking data represents a change in a pose of at least one of the image devices that occurs while the imaging devices capture images of the scene, and fuse, based on the second tracking data, second data sets respectively associated with the imaging devices to generate a second fused set of data for the scene.

Each fused set of data may represent or be used to generate a perception (e.g., a segmentation) of the scene imaged by the imaging devices. For instance, the system may generate, based on a fused set of data, a merged segmentation of the scene in which classification labels are applied to data points representing the imaged scene. The classification labels may indicate objects or types of objects in the scene that are predicted to be represented by the data points.

In certain illustrative examples, a system may be configured to adjust scene perception based on scene perception data generated by the system. For example, the system may use data associated with merging of images and/or segmentation of a scene to dynamically adjust elements of a scene perception system and/or the scene to optimize perception of the scene. In certain examples, for instance, based on data associated with scene perception, the system may facilitate automated or manual movement of an imaging device from one viewpoint to another viewpoint that may provide a more useful view of the scene. Such feedback-based control of the imaging device may configure a multi-device architecture in a way that optimizes scene perception. The optimization may be performed dynamically in real time while scene perception is being performed. Examples of a feedback control loop for optimization of scene perception are described herein.

Systems and methods described herein may provide various advantages and benefits. For example, systems and methods described herein may provide accurate, dynamic, and/or flexible scene perception (e.g., segmentation of an imaged scene). Illustrative examples of dynamic multi-device scene perception described herein may be more accurate than conventional scene perception that is based on single-device scene perception or fixed multi-device scene perception. Illustrative examples of dynamic multi-device scene perception described here may be well suited for scene perception of dynamic and/or complex scenes, such as a scene associated with a surgical procedure.

Various illustrative embodiments will now be described in more detail. The disclosed systems and methods may provide one or more of the benefits mentioned above and/or various additional and/or alternative benefits that will be made apparent herein. While certain examples of scene perception described herein are directed to segmentation of a scene, one or more systems, methods, and/or operations described herein may be used for additional or alternative scene perception tasks such as object detection (e.g., detection of types of objects such as humans, equipment, etc.), pose estimation (e.g., determining poses of objects with respect to a robotic system), and/or object tracking within a scene (e.g., temporal object tracking in the scene).

FIG. 1 depicts an illustrative scene perception system 100 ("perception system 100" or "system 100"). As shown, system 100 may include multiple imaging devices 102-1 and 102-2 (collectively "imaging devices 102") positioned relative to a scene 104. Imaging devices 102 may be configured to image scene 104 by concurrently capturing images of scene 104, such as by capturing images of scene 104 at a shred frame rate.

Scene 104 may include any environment and/or elements of an environment that may be imaged by imaging devices 102. For example, scene 104 may include a tangible real-world scene of physical elements. In certain illustrative examples, scene 104 is associated with a medical procedure such as a surgical procedure. For example, scene 104 may include a surgical scene at a surgical site such as a surgical facility, operating room, or the like. For instance, scene 104 may include all or part of an operating room in which a surgical procedure may be performed on a patient. In certain implementations, scene 104 includes an area of an operating room proximate to a robotic surgical system that is used to perform a surgical procedure. While certain illustrative examples described herein are directed to scene 104 including a scene at a surgical facility, one or more principles described herein may be applied to other suitable scenes in other implementations.

Imaging devices 102 may include any imaging devices configured to capture images of scene 104. For example, imaging devices 102 may include video imaging devices, infrared imaging devices, visible light imaging devices, non-visible light imaging devices, intensity imaging devices (e.g., color, grayscale, black and white imaging devices), depth imaging devices (e.g., stereoscopic imaging devices, time-of-flight imaging devices, infrared imaging devices, etc.), any other imaging devices, or any combination or sub-combination of such imaging devices. Imaging devices 102 may be configured to capture images of scene 104 at any suitable capture rates. Imaging devices 102 may be synchronized in any suitable way for synchronous capture of images of scene 104. The synchronization may include operations of the imaging devices being synchronized and/or data sets output by the imaging devices being synchronized by matching data sets to common points in time.

FIG. 1 illustrates a simple configuration of two imaging devices 102 positioned to capture images of scene 104 from two different viewpoints. This configuration is illustrative. It will be understood that a multi-imaging device architecture may include two or more imaging devices positioned to capture images of scene 104 from two or more different viewpoints.

Imaging devices 102 may have the same or different intrinsic parameters. Imaging devices 102 have different extrinsic parameters at least because imaging devices 102 have different poses relative to scene 104. A pose of an imaging device may include a spatial position and orientation of the imaging device that defines, at least in part, a viewpoint of the imaging device relative to scene 104. Imaging devices 102 may be associated with respective coordinate frames 106 of reference used to define the poses of the imaging devices. As shown, imaging device 102-1 may be associated with coordinate frame 106-1 having axes X1, Y1, and Z1, and imaging device 102-2 may be associated with coordinate frame 106-2 having axes X2, Y2, and Z2.

Imaging devices 102 may be considered to form a dynamic multi-imaging-device architecture in that at least one of imaging devices 102 may dynamically move relative to scene 104 and/or relative to one or more other imaging devices 102 in the architecture while imaging devices 102 capture images of scene 104. The movement of an imaging device 102 relative to scene 104 and/or another imaging device 102 may include a change in the pose of the imaging device 102 relative to scene 104 and/or the other imaging device 102. The change in the pose may include changes in one or more degrees of freedom, such as a change or changes in position and/or orientation (e.g., a change in pitch, yaw, and/or roll) of the imaging device 102. Such a change to the pose of the imaging device 102 may be considered to change a viewpoint of the imaging device 102 relative to scene 104 and/or to change a relationship between the imaging device 102 and one or more other imaging devices 102 included in the dynamic multi-imaging-device architecture (e.g., by changing a spatial relationship between imaging devices 102). Dashed lines shown in FIG. 1 illustrate a physical movement of imaging device 102-1 from a first pose to a second pose, which movement includes a change in position and orientation of the imaging device 102-1. The coordinate frame 106-1 associated with imaging device 102-1 moves correspondingly, as is represented by dashed line coordinate frame 106-1' having axes X1', Y1', and Z1'. The movement of imaging device 102-1 changes the viewpoint of imaging device 102-1 relative to scene 104, as well as a relationship between the imaging device 102-1 and imaging device 102-2. For example, a spatial relationship between imaging device 102-1 and 102-2 has changed.

An imaging device 102 may physically move relative to scene 104 and/or other imaging devices 102 in any suitable way. For example, the imaging device 102 may include an articulating imaging device configured to articulate relative to scene 104. In certain examples, the imaging device 102 may articulate because the imaging device 102 is attached to an articulating support structure such that when the articulating support structure articulates the imaging device 102 articulates correspondingly. In certain examples, the imaging device 102 is mounted to an articulating arm of a robotic system such as a teleoperated robotic arm of the robotic system. In certain examples, the imaging device 102 is mounted to an articulating support structure in a surgical facility, such as to an articulating imaging device boom, surgical cart, or other structure in the surgical facility.

In addition or alternative to an imaging device 102 physically moving relative to scene 104 and/or another imaging device 102, an imaging device 102 may be considered to move relative to scene 104 and/or another imaging device 102 in one or more other ways. In certain embodiments, for example, a movement of an imaging device 102 may include any change to a field of view of the imaging device 102. The change to the field of view may be caused by any suitable change to one or more parameters of the imaging device 102, including a change to intrinsic and/or extrinsic parameters of the imaging device 102. As an example, a change to a zoom parameter changes a field of view of the imaging device 102. As another example, a change to a spatial position and/or orientation of the imaging device 102 changes the field of view of the imaging device 102. A change to a field of view of an imaging device 102 may change the field of view of the imaging device 102 relative to scene 104 and/or another imaging device 102 and may be considered a movement of the imaging device 102 relative to scene 104 and/or the other imaging device 102.

In certain illustrative examples, a dynamic multi-imaging-device architecture may include multiple imaging devices 102 mounted on different components of a robotic surgical system, with one or more of the components configured to articulate relative to an imaged scene and relative to one or more of the other components of the robotic surgical system. For example, imaging device 102-1 may be mounted on an articulating or non-articulating component of the robotic system, and imaging device 102-2 may be mounted on another articulating component of the robotic system.

In certain illustrative examples, one or more imaging devices 102 of a dynamic multi-imaging-device architecture may be mounted on additional or alternative components of a surgical facility such as other components in an operating room. For example, imaging device 102-1 may be mounted on an articulating or non-articulating component of a surgical facility, and imaging device 102-2 may be mounted on another articulating component of the surgical facility. As another example, imaging device 102-1 may be mounted on an articulating component of a robotic system, and imaging device 102-1 may be mounted on an articulating or non-articulating component of the surgical facility.

In certain illustrative examples, one or more imaging devices 102 of a dynamical multi-imaging-device architecture may be mounted on separate systems or components that are not connected by a mechanical base or do not have a fixed or predictable mechanical connection. For example, imaging devices 102 may be mounted on different robotic systems (e.g., on different moveable carts or bases of the robotic systems). For example, imaging device 102-1 may be mounted on an articulating or non-articulating component of a first robotic system, and imaging device 102-2 may be mounted on an articulating component of a second robotic system that does not have a fixed or predictable mechanical connection with the first robotic system. As another example, imaging device 102-1 may be mounted on an articulating or non-articulating component of a robotic system, and imaging device 102-2 may be mounted on an articulating or non-articulating component of a surgical facility, which component does not have a fixed or predictable mechanical connection with the robotic system.

When imaging devices 102 are mounted on separate systems that do not have a fixed or predictable mechanical connection between them, a relationship between the separate systems may be determined in any suitable way and used to determine a relationship between imaging devices 102. For example, the separate systems may be registered one to another based on image data depicting the poses of the separate systems and/or based on any other suitable data. In certain examples, imaging devices 102 mounted on separate systems may be registered to each other in any of the ways described in International Application No. PCT/US18/0606 filed Nov. 13, 2018 and titled "Master/Slave Registration and Control for Teleoperation," which is hereby incorporated by reference.

In certain examples, imaging devices 102 included in a dynamic multi-imaging-device architecture may include any combination of dynamically moveable imaging devices and fixed-pose imaging devices. In other examples, imaging devices 102 included in a dynamic multi-imaging-device architecture may include any combination of dynamically moveable imaging devices.

One or more parameters of an imaging device 102 may change dynamically while the imaging device 102 is capturing scene images that are being used for scene perception. For example, a dynamically moveable imaging device 102 may change pose dynamically while the imaging device 102 is capturing scene images that are being used for perception of scene 104. As the pose of the imaging device 102 changes, the relationship of the viewpoint of the imaging device 102 dynamically changes relative to the scene 104 and to one or more other imaging devices 102 that are concurrently capturing images of the scene 104.

One or more parameters of imaging devices 102 in a dynamic multi-imaging-device architecture may be tracked and used for scene perception operations. For example, poses of one or more imaging devices 102 in a dynamic multi-imaging-device architecture may be tracked and used for scene perception operations such as operations to fuse data sets respectively associated with the imaging devices 102 to form fused sets of data that represent or are used to generate perceptions of scene 104. Tracking data may indicate dynamic movement of at least one of imaging devices 102, such as a change in a pose of at least one of imaging devices 102. Accordingly, the tracking data may be accessed and used to account for dynamic movement of one or more imaging devices 102 when performing scene perception operations. In certain implementations, tracking data may be access and used to determine relationships between the imaging devices 102 and/or with scene 104 or another coordinate frame. For example, poses of imaging devices 102 in a dynamic multi-imaging-device architecture may be tracked and used to determine relationships between the imaging devices 102 and/or with scene 104 or another coordinate frame. The determined relationships may be used to fuse data sets respectively associated with the imaging devices 102 (e.g., video imagery captured by the imaging devices 102) to form a fused set of data for perception of scene 104 (e.g., segmentation of the scene 104).

Parameters of the imaging devices 102 and changes to the parameters of the imaging devices 102 (e.g., poses and changes to poses of the imaging devices 102) may be tracked or otherwise detected in any suitable way. For example, sensors may be implemented on the imaging devices 102 and/or articulating support structures to which the imaging devices 102 are attached. The sensors may sense motion and provide sensor data representing the sensed motion. The sensor data may be processed to determine current poses and/or changes to the poses of the imaging devices 102. Additionally or alternatively, images of the imaging devices 102 may be captured by one or more additional imaging devices of a imaging device monitoring system and processed to determine poses and/or changes to the poses of the imaging devices 102 using computer vision techniques. Additionally or alternatively, sensed or derived kinematics data such as robotic kinematics data (e.g., data descriptive of velocity and acceleration of links in kinematic chains of robotic systems) may be accessed and processed to determine poses and/or changes to the poses of imaging devices 102. Additionally or alternatively, any other suitable mechanism for determining poses and/or changes to the poses of imaging devices 102 may be used. Any suitable combination of various ways of determining poses and/or changes to the poses of imaging devices 102 may also be used. For example, kinematics data may be used in combination with vision data to determine poses and/or changes to the poses of imaging devices 102. In some examples, the vision data may be used to get missing kinematics data and/or to adjust kinematics data.

A calibration, such as a one-time calibration, may be performed to calibrate imaging devices 102 and data used to track poses of imaging devices 102. The calibration may be performed in any suitable way and may result in a known relationship between imaging devices 102 and data used to track poses of imaging devices 102. Accordingly, the tracking data and the calibrated known relationship of the tracking data to imaging devices 102 may be used to track poses of imaging devices 102, including as the poses of one or more of the imaging devices 102 dynamically change while the imaging devices 102 capture imagery of scene 104. For example, imaging devices 102 may be calibrated to kinematics data for articulating structures to which imaging devices 102 are mounted to determine a relationship that may be applied to kinematics data of the articulating structures to determine imaging device poses. The poses may be used to determine viewpoints and/or fields of view of the imaging devices 102.

As shown in FIG. 1, system 100 may include a processing system 108 communicatively coupled to imaging devices 102. Processing system 108 may be configured to detect movement of imaging devices, such as by accessing data representing parameters of imaging devices 102 and identifying, from the data, movement of the imaging devices 102. The data may indicate dynamic movement of imaging devices 102 relative to one another, scene 104, and/or another coordinate frame while the imaging devices 102 capture images of scene 104 from different viewpoints. Processing system 108 may generate, based on the data, data sets respectively associated with imaging devices 102 to generate a fused set of data. To this end, processing system 108 may access or generate the data sets respectively associated with imaging devices 102 and process the data sets, such as by applying one or more transforms generated based on image device tracking data to generate a fused set of data.

The fusing may include processing system 108 generating one or more transforms based on poses of imaging devices 102 that are determined from imaging device tracking data and applying the transforms to one or more of the data sets to generate the fused set of data. Application of the transforms to the data sets may merge the data sets into a common coordinate frame. The common coordinate frame may be any suitable frame of reference, such as a world coordinate frame, a coordinate frame for scene 104, a coordinate frame for one of imaging devices 102, or any other suitable coordinate frame. Merging the data sets into the common coordinate frame may align data points such as three-dimensional (3D) voxels or two-dimensional (2D) pixels of images captured by imaging devices 102 based on poses of imaging devices (e.g., based on a determined spatial relationship between imaging devices 102). Processing system 108 may be configured to fuse 2D or 3D geospatial data sets associated with images captured from different viewpoints of scene 104 at a common point in time.

In certain examples, the fusing may include merging aligned (or overlapping) voxels or pixels, such as by blending intensity and/or depth values for aligned voxels or pixels. The blending may include weighted blending in which the data points being blended are weighted based on one or more factors, such as which of imaging devices 102 has the best view of a data point (e.g., by more heavily weighting data captured by the imaging device 102 with the best viewing angle). In certain examples, the fusing may additionally or alternatively include stitching non-overlapping voxels or pixels together, such as by stitching images together along non-overlapping boundaries of the images.

The data sets associated with imaging devices 102 may include any data generated by imaging devices 102 and/or derived from data generated by imaging devices 102. For example, the data sets may include 3D data sets representing 3D imagery of scene 104, 2D data sets representing 2D imagery of scene 104, and/or segmentation data sets representing single-viewpoint segmentations of scene 104 from the viewpoints of imaging devices 102. In examples in which the data sets include segmentation data sets representing single-viewpoint segmentations of scene 104, the fusing of data sets may include merging the segmentation data sets into a fused set of segmentation data.

Processing system 108 may use a fused data set to perform one or more scene perception operations. For example, processing system 108 may use a fused data set to generate a fused segmentation of scene 104, which is represented as scene segmentation 110 in FIG. 1. In certain examples, the fused data set may represent a merged segmentation of scene 104. In other examples, the fused data set may be input to a scene segmentation algorithm to generate a merged segmentation of scene 104 based on the fused data set.

Figure 2A:
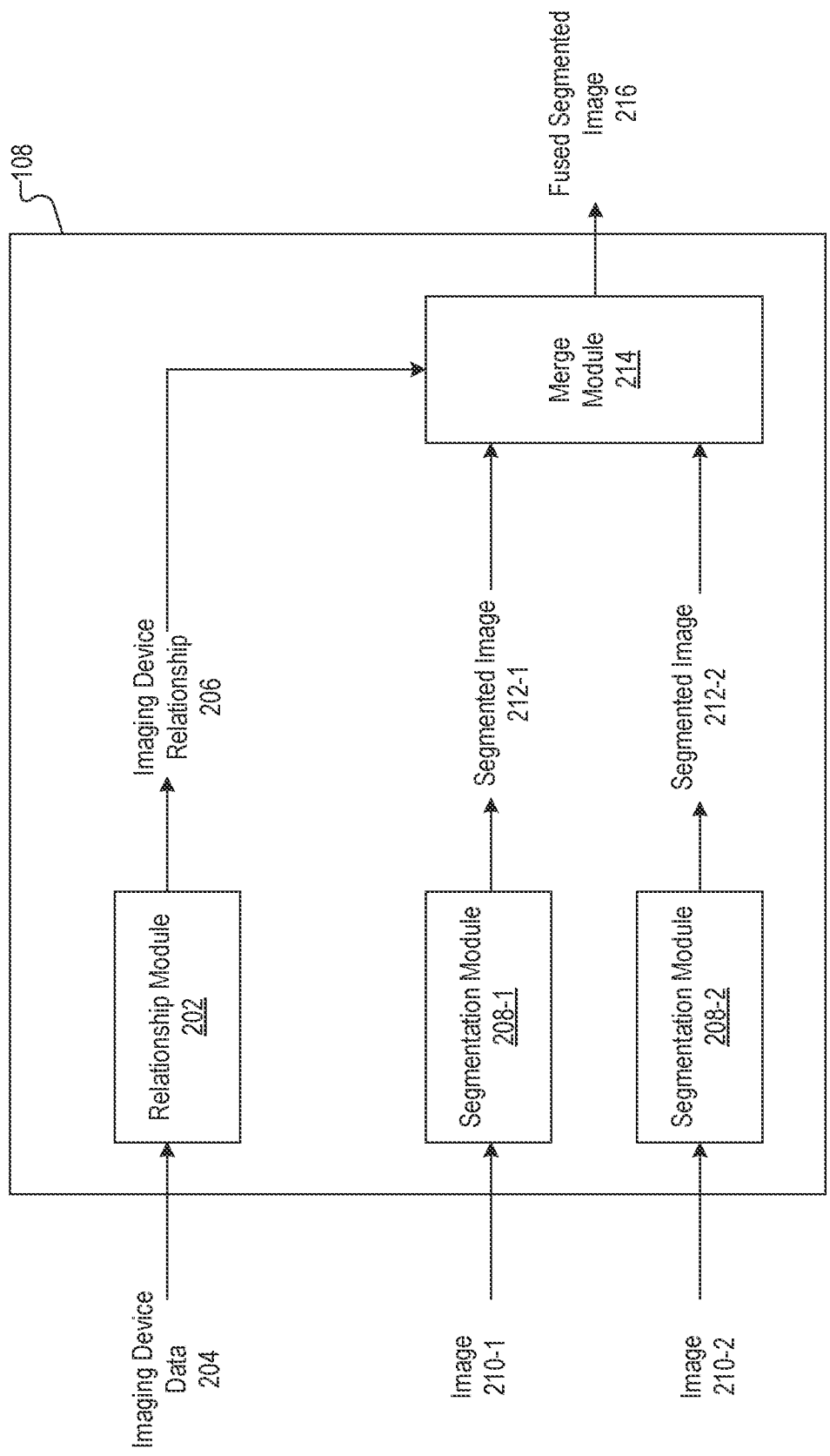
FIGS. 2A-2B depict illustrative flows of data as processed by a processing system according to principles described herein.

FIG. 2A depicts an illustrative flow of data as processed by processing system 108. As shown, processing system 108 may include a relationship module 202 that receives imaging device data 204 representing information about imaging devices such as imaging devices 102. The information may include parameter information for one or more parameters of the imaging devices, such as intrinsic and/or extrinsic parameters for the imaging devices. The information may represent, directly or indirectly, pose information for the imaging devices. Imaging device data 204 may include or be referred to as tracking data for the imaging device.

Relationship module 202 may be configured process the imaging device data 204 to determine an imaging device relationship 206, which may include a relationship between imaging devices 102, between imaging devices 102 and scene 104, and/or between imaging devices 102 and a common coordinate frame of reference. The imaging device relationship 206 may indicate any suitable relationship, such as a spatial relationship between poses, viewpoints, and/or fields of view of the imaging devices, between poses, viewpoints, and/or fields of view of the imaging devices and a scene or a common frame of reference. The imaging device relationship 206 may be represented by any suitable relationship data, including by one or more transforms configured to be applied to imaging device data sets to transform the data sets to a common coordinate frame.

Relationship module 202 may be configured to continually (e.g., periodically at any suitable frame rate) receive imaging device data 204 and generate imaging device relationship 206 data based on the imaging device data 204. Accordingly, when imaging device data 204 indicates a movement such as a change in pose of an imaging device, relationship module 202 may update the imaging device relationship 206 data to reflect the change.

Processing system 108 may also include individual segmentation modules 208-1 and 208-2 that receive images 210-1 and 210-2, respectively. Image 210-1 may represent an image data set received from imaging device 102-1, and image 210-2 may represent an image data set received from imaging device 102-2. Images 210-1 and 210-2 may be images of scene 104 as concurrently captured by imaging devices 102-1 and 102-2 from different viewpoints. Images 210-1 and 210-2 may include 3D or 2D imagery of scene 104. For the example shown in FIG. 2A, images 210-1 and 210-2 are considered 2D projection images of scene 104.

Segmentation modules 208-1 and 208-2 may each be configured to perform segmentation operations on images 210-1 and 210-2, respectively, to generate respective segmented images 212-1 and 212-2. Segmented image 212-1 may include classification labels assigned to pixels of image 210-1, and segmented image 212-2 may include classification labels assigned to pixels of image 210-2.

Processing system 108 may further include a merge module 214 that receives imaging device relationship 206 data from relationship module 202, and segmented images 212-1 and 212-2 from segmentation modules 208-1 and 208-2, respectively. Merge module 214 may be configured to fuse segmented images 212-1 and 212-2, based on imaging device relationship 206, to generate a fused segmented image 216 of scene 104. Merge module 214 may be configured to perform any suitable merge operations to fuse segmented images 212-1 and 212-2 to form fused segmented image 216 of scene 104. Examples of such operations include, without limitation, applying one or more transforms (which represent or are derived from imaging device relationship 206) to combine segmented images 212-1 and 212-2 to a common coordinate frame such that corresponding data points in segmented images 212-1 and 212-2 are aligned in the common coordinate frame, blending values of aligned data points to determine a blended value for the aligned data points (e.g., blending classification labels to determine a classification label for aligned data points), and the like.

Fused segmented image 216 may classify objects in imaged scene 104 more accurately than single-imaging device-based segmentation such as individual segmented images 212-1 and 212-2. The improvement in accuracy may result from a number of factors, which may include the use of image data from multiple different viewpoints to classify image data points, sensor redundancy, robustness against occlusion, and/or the ability of an imaging device to be dynamically adjusted, during capture time, in a way (e.g., by changing a pose of the imaging device) that is advantageous for classifying data points captured by the imaging device.

The data flow depicted in FIG. 2A is illustrative of one example. Data may be processed in other suitable flows or ways in other examples. For example, images in the data flow may include 3D data sets instead of 2D data sets. As another example, a merge module may be placed more forward in the data flow such that received images are fused into a fused image before any segmentation is performed, and then a segmentation module may perform segmentation on the fused image.

Figure 2B:
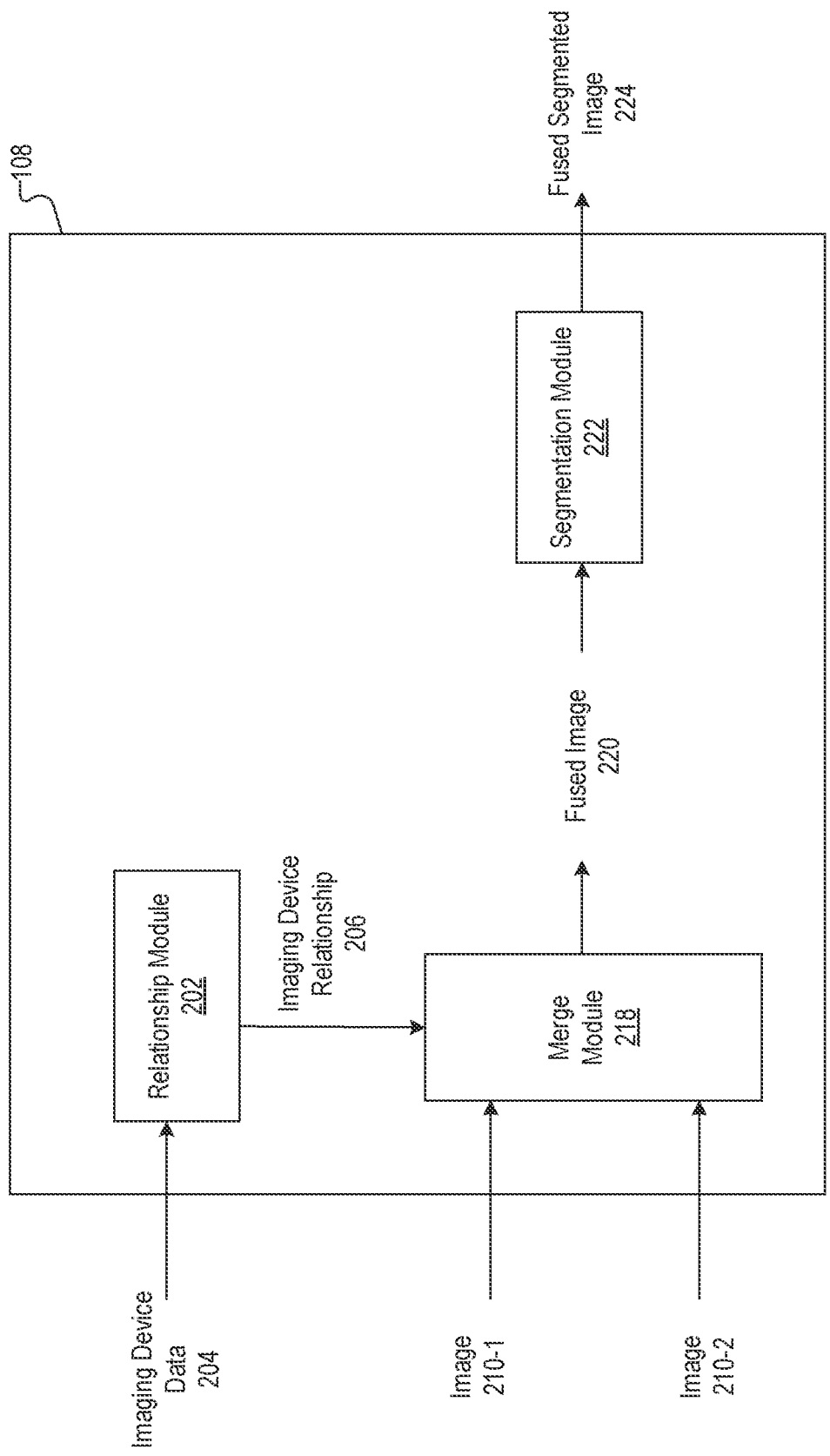

FIG. 2B depicts another illustrative flow of data as processed by another implementation of processing system 108. As shown, processing system 108 may include relationship module 202 that receives imaging device data 204 and determines an imaging device relationship 206 based on the imaging device data 204. Processing system 108 may further include a merge module 218 that receives image 210-1, image 210-2, and imaging device relationship 206 data, and uses imaging device relationship 206 data to fuse images 210-1 and 210-2 to form a fused image 220. Processing system 108 further includes a segmentation module 222 that receives and processes fused image 220 to generate a fused segmented image 224.

Segmented images 212 and fused segmented image 216 in FIG. 2A and fused segmented image 224 in FIG. 2B may represent illustrative forms of scene perception data that may be generated by processing system 108. Processing system 108 may be configured to generate additional and/or alternative forms of scene perception data in other examples.

In certain implementations, processing system 108 may be configured to perform one or more operations to adjust scene perception based on data accessed and/or generated by processing system 108, including scene perception data generated by processing system 108. For example, processing system 108 may use data associated with merging of images and/or segmentation of a scene to dynamically adjust elements of scene perception system 100 and/or scene 104 to optimize perception of scene 104. This may form a feedback control loop that processing system 108 uses to dynamically optimize scene perception in real time as scene perception is being performed.

To facilitate such optimization of scene perception, processing facility 108 may be configured to analyze data associated with scene perception. This may include analyzing any data accessed and/or generated by processing facility 108, including, for example, imaging device data 204, imaging device relationship 206 data, images 210, segmented images 212, fused segmented image 216, fused image 220, fused segmented image 224, any other data accessed or generated by processing system 108, or any combination or sub-combination of such data. The analysis may include analysis of any aspect(s) of the data. As an example, processing system 108 may analyze confidence scores associated with segmentation classifications of image data for one or more images (e.g., segmented images 212, fused segmented image 216, and/or fused segmented image 224). As another example, processing system 108 may analyze content and/or parameters of images (e.g., image 210-1, image 210-2, fused image 220, and/or segmented images 212, 216, 224), such as by analyzing images to check for poor image quality, obstruction of expected objects in a scene, etc.)

Based on analysis of data associated with scene perception, processing system 108 may determine a potential for improvement in scene perception. The potential for improvement may include any suitable improvement such as an improvement that may be made dynamically while scene perception is being performed by processing system 108. In certain examples, a potential for improvement may include a potential to improve confidence scores associated with scene segmentation, such as by improving confidence scores to satisfy a defined threshold (e.g., by improving confidence scores from being below a threshold to being above the threshold). Additionally or alternatively, a potential for improvement may include a potential to improve image content and/or quality.

Processing system 108 may determine a potential for improvement in scene perception in any suitable way. For example, processing system 108 may compare values of data sets associated with scene perception to one or more defined thresholds and identify a potential for improvement when values are below a defined threshold. This may include comparison of confidence scores for segmentation data to confidence thresholds, comparison of image parameter values (e.g., luminance, contrast, saturation, exposure, chrominance, etc.) to image thresholds, and the like.

As another example, processing system 108 may compare data associated with different imaging device images and use the comparison to determine a potential for improvement in scene perception. For example, processing system 108 may compare image data captured by one imaging device to image data captured by another imaging device and, based on the comparison, determine a potential for improvement in scene perception. For instance, the comparison may reveal that one of the images differs from the other image in quality and/or content that has a potential for improvement. As another example, processing system 108 may compare segmentation data for an image captured by one imaging device to segmentation data for another image captured by another imaging device and, based on the comparison, determine a potential for improvement in scene perception. For instance, confidence scores for the segmentation data for one image may be significantly lower than confidence scores for the segmentation data for another image, which may indicate a potential for improvement in the segmentation data for the image.

To illustrate a specific example of determining a potential for improvement of scene perception, processing system 108 may determine that confidence scores for segmentation data for fused segmented image 216 are below a defined threshold. In response, processing system 108 may analyze confidence scores for segmentation data for segmented images 212-1 and 212-2 and may determine that confidence scores for segmented image 212-1 are above a threshold and that confidence scores for segmented image 212-2 are below a threshold. Based on this, processing system 108 may identify a potential for improvement in scene perception by improving the confidence scores for segmented image 212-2.

These examples are illustrative. Processing system 108 may use any suitable additional or alternative data and defined rules to identify a potential for improvement in scene perception.

Figure 3:
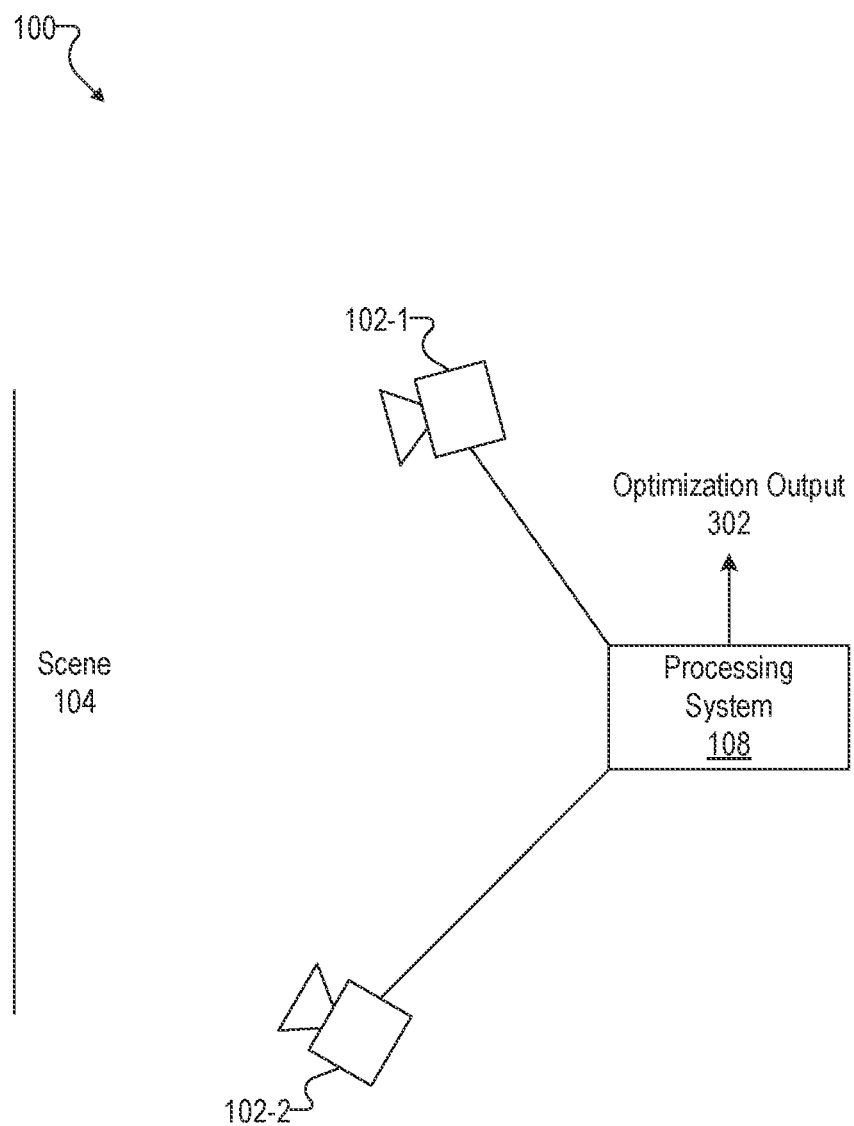
FIG. 3 depicts an illustrative scene perception system configured to use a feedback control loop to facilitate optimization of scene perception according to principles described herein.

Based on a determination of a potential for improvement of scene perception, processing system 108 may perform one or more operations to improve scene perception. This may include processing system 108 generating and providing optimization output indicating an operation to be performed to improve scene perception. FIG. 3 illustrates scene perception system 100 further configured to use a feedback control loop to optimize scene perception. As shown, processing system 108 may provide an optimization output 302, which may be configured to indicate one or more operations to be performed to optimize scene perception. Processing system 108 may be configured to provide optimization output 302 to any suitable destination, including to one or more components of scene perception system 100 (e.g., imaging devices 102), a robotic system associated with scene perception system 100, an output device (e.g., a display device) for presentation, and/or a user of scene perception system 100 or the robotic system. Optimization output 302 may be configured to direct such destinations to perform one or more operations configured to facilitate optimization of perception of scene 104.

As an example, optimization output 302 may indicate a change to be made to one or more parameters of one or more imaging devices 102 of a multi-imaging-device architecture. For example, optimization output 302 may indicate a change to any adjustable setting of an imaging device (e.g., focus, zoom, shutter speed, auto-exposure setting, luminance, gain, etc.) and/or to a pose, viewpoint, and/or field of view of an imaging device. Additionally or alternatively, optimization output 302 may indicate a change to be made to one or more parameters of one or more other components of perception system 100, including processing system 108.

As another example, optimization output 302 may indicate a change to be made to one or more parameters of one or more components of a robotic system associated with system 100, such as a robotic surgical system used to perform a surgical procedure while system 100 performs operations to perceive scene 104. Scene 104 may be associated with the surgical procedure in any suitable way, such as by being a location of the surgical procedure and/or a location associated with performance of the surgical procedure (e.g., a space within a medical operating room in which the robotic surgical system operates). Optimization output 302 may indicate a change to any components of the robotic system. For example, optimization output 302 may indicate a change in a pose of a surgical instrument attached to the robotic surgical system (e.g., to move the surgical instrument out of the field of view of an imaging device 102 so as to not interfere with imagery of scene 104 being captured by the imaging device 102). As another example, optimization output 302 may indicate a change in positioning of components of an articulating component of the robotic system, such as a change in positioning of a manipulator, a console, or a cart of the robotic system (e.g., to move the components such that the viewpoints of one or more imaging devices 102 are changed to new viewpoints that are potentially more advantageous for perception of scene 104.

As another example, optimization output 302 may indicate a change to be made to one or more parameters of one or more components of a surgical facility associated with system 100. For example, optimization output 302 may indicate a change to an articulating component (e.g., an articulating camera boom) at the surgical facility, a repositioning of a component such as a surgical cart or operating table at the surgical facility, a repositioning of a surgical team member at the surgical facility, an adjustment of a sterilization drape at the surgical facility, and the like.

These examples of optimization operations are illustrative. Additional or alternatively optimization operations may be generated and provided by processing system 108 in other examples.

Processing system 108 may provide optimization output 302 to any destinations that may facilitate performance of the operations to optimize scene perception. As an example, processing system 108 may provide optimization output 302 to system 100 (e.g., to one or more imaging devices 102 and/or to processing system 108), to a robotic system associated with system 100, to an output device (e.g., a display device) for presentation, and/or to any other suitable destination. The optimization output 302 may be configured to instruct any such destination device(s) to perform one or more operations designed to facilitate improvement of perception of scene 104, including any of the example operations described herein.

Optimization output 302 may be configured to facilitate automated and/or manual improvement of scene perception. For example, optimization output 302 may be configured to instruct a destination device to perform an operation to improve scene perception in an automated manner (e.g., by automatically adjusting a pose of an imaging device 102). In another example, optimization output 302 may be configured to instruct a destination device to perform an operation to prompt a user of system 100 and/or a robotic system associated with system 100 to perform a manual operation configured to improve scene perception (e.g., by prompting a surgical team member to move a component of the robotic system or a surgical facility to a different position).

To continue the specific example in which the confidence scores for segmented image 212-1 are above a threshold and the confidence scores for segmented image 212-2 are below a threshold, processing system 108 may determine one or more operations that may be performed to improve the confidence scores for segmented image 212-2 and provide output indicating the determined operation(s). As an example, processing system 108 may determine a potentially more optimal pose of imaging device 102-2 and may instruct a robotic system to robotically move imaging device 102-2 to the new pose.

Processing system 108 may continually perform the operations described above to continue to dynamically optimize scene perception while scene perception is ongoing. Such operations may be performed by processing system 108 in real time as scene perception operations are being performed.

While optimization of scene perception is described above with reference to a dynamic scene perception architecture that includes multiple imaging devices, one or more of the optimization principles may apply to other scene perception architectures. For example, certain optimization principles may apply to a single imaging device architecture and/or to a fixed imaging device architecture.

In certain examples, system 100 may be configured to implement and apply artificial intelligence algorithms such as machine learned algorithms to perform one or more operations described herein. Any suitable form of artificial intelligence and/or machine learning may be used, including, for example, deep learning, neural networks, etc.

In certain examples, artificial intelligence algorithms may be employed for fusing data sets associated with different imaging devices into a fused set of data. For example, a machine learned algorithm may be generated through machine learning procedures and applied to fusing operations. The machine learned algorithm may operate as a fuse function that is used in combination with a determined imaging device relationship to fuse disparate data sets.

In certain examples, artificial intelligence algorithms may be employed for segmenting imagery of a scene. For example, a machine learned algorithm may be generated through machine learning procedures and applied to segmentation operations. The machine learning algorithm may operate as a segmentation function that is applied to individual and/or fused imagery to classify data points (e.g., pixels) in the imagery.

In certain examples, artificial intelligence algorithms may be employed to optimize scene perception, such as by optimizing a dynamic multiple imaging device architecture. For example, a machine learned algorithm may be generated through machine learning procedures and applied to control movement of one or more imaging devices in the dynamic multiple imaging device architecture such that one or more imaging devices of the dynamic multiple imaging device architecture are optimally, automatically, and/or dynamically positioned, e.g., during capture time, to capture imagery that is well-suited for accurate fusing and/or segmentation. For instance, a moveable imaging device may be directed to move to a particular pose relative to a scene and/or other imaging devices, where the relative pose is conducive to capturing imagery that facilitates accurate fusing and/or segmentation of the scene.

In certain examples, system 100 may be associated with a robotic system, such as by being included in, implemented by, or connected to one or more components of a robotic system (e.g., a robotic surgical system, and/or a teleoperated robotic system). For example, system 100 may be implemented by or as one or more components of a robotic system. As another example, system 100 may be implemented by a stand-alone computing system communicatively coupled to a robotic system.

Figure 4:
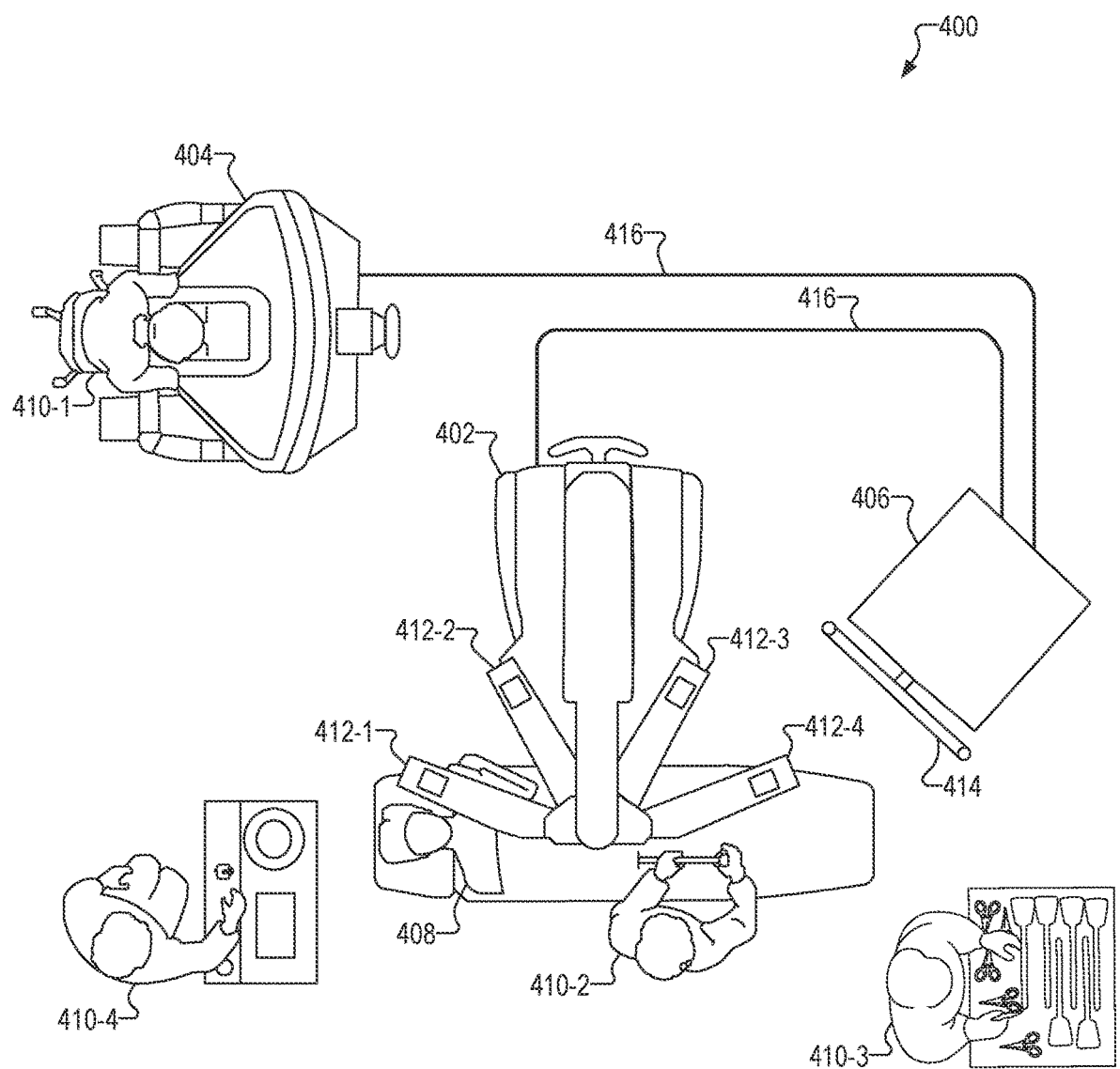
FIG. 4 depicts an illustrative computer-assisted robotic surgical system according to principles described herein.

FIG. 4 shows an exemplary computer-assisted robotic surgical system 400 ("surgical system 400") associated with system 100. System 100 may be implemented by surgical system 400, connected to surgical system 400, and/or otherwise used in conjunction with surgical system 400.

As shown, surgical system 400 may include a manipulating system 402, a user control system 404, and an auxiliary system 406 communicatively coupled one to another. Surgical system 400 may be utilized by a surgical team to perform a computer-assisted surgical procedure on a patient 408. As shown, the surgical team may include a surgeon 410-1, an assistant 410-2, a nurse 410-3, and an anesthesiologist 410-4, all of whom may be collectively referred to as "surgical team members 410." Additional or alternative surgical team members may be present during a surgical session.

While FIG. 4 illustrates an ongoing minimally invasive surgical procedure, it will be understood that surgical system 400 may similarly be used to perform open surgical procedures or other types of surgical procedures that may similarly benefit from the accuracy and convenience of surgical system 400. Additionally, it will be understood that the surgical session throughout which surgical system 400 may be employed may not only include an operative phase of a surgical procedure, as is illustrated in FIG. 4, but may also include preoperative (which may include setup of surgical system 400), postoperative, and/or other suitable phases of the surgical procedure.

As shown in FIG. 4, manipulating system 402 may include a plurality of manipulator arms 412 (e.g., manipulator arms 412-1 through 412-4) to which a plurality of surgical instruments may be coupled. Each surgical instrument may be implemented by any suitable surgical tool (e.g., a tool having tissue-interaction functions), medical tool, imaging device (e.g., an endoscope, an ultrasound tool, etc.), sensing instrument (e.g., a force-sensing surgical instrument), diagnostic instrument, or the like that may be used for a computer-assisted surgical procedure on patient 408 (e.g., by being at least partially inserted into patient 408 and manipulated to perform a computer-assisted surgical procedure on patient 408). While manipulating system 402 is depicted and described herein as including four manipulator arms 412, it will be recognized that manipulating system 402 may include only a single manipulator arm 412 or any other number of manipulator arms as may serve a particular implementation.

Manipulator arms 412 and/or surgical instruments attached to manipulator arms 412 may include one or more displacement transducers, orientational sensors, and/or positional sensors used to generate raw (i.e., uncorrected) kinematics information. One or more components of surgical system 400 may be configured to use the kinematics information to track (e.g., determine poses of) and/or control the surgical instruments, as well as anything connected to the instruments and/or arms. As described herein, system 100 may use the kinematics information to track components of surgical system 400 (e.g., manipulator arms 412 and/or surgical instruments attached to manipulator arms 412).

User control system 404 may be configured to facilitate control by surgeon 410-1 of manipulator arms 412 and surgical instruments attached to manipulator arms 412. For example, surgeon 410-1 may interact with user control system 404 to remotely move or manipulate manipulator arms 412 and the surgical instruments. To this end, user control system 404 may provide surgeon 410-1 with imagery (e.g., high-definition 3D imagery) of a surgical site associated with patient 408 as captured by an imaging system (e.g., an endoscope). In certain examples, user control system 404 may include a stereo viewer having two displays where stereoscopic images of a surgical site associated with patient 408 and generated by a stereoscopic imaging system may be viewed by surgeon 410-1. Surgeon 410-1 may utilize the imagery displayed by user control system 404 to perform one or more procedures with one or more surgical instruments attached to manipulator arms 412.

To facilitate control of surgical instruments, user control system 404 may include a set of master controls. These master controls may be manipulated by surgeon 410-1 to control movement of surgical instruments (e.g., by utilizing robotic and/or teleoperation technology). The master controls may be configured to detect a wide variety of hand, wrist, and finger movements by surgeon 410-1. In this manner, surgeon 410-1 may intuitively perform a procedure using one or more surgical instruments.

Auxiliary system 406 may include one or more computing devices configured to perform processing operations of surgical system 400. In such configurations, the one or more computing devices included in auxiliary system 406 may control and/or coordinate operations performed by various other components (e.g., manipulating system 402 and user control system 404) of surgical system 400. For example, a computing device included in user control system 404 may transmit instructions to manipulating system 402 by way of the one or more computing devices included in auxiliary system 406. As another example, auxiliary system 406 may receive and process image data representative of imagery captured by one or more imaging devices attached to manipulating system 402.

In some examples, auxiliary system 406 may be configured to present visual content to surgical team members 410 who may not have access to the images provided to surgeon 410-1 at user control system 404. To this end, auxiliary system 406 may include a display monitor 414 configured to display one or more user interfaces, such as images of the surgical site, information associated with patient 408 and/or the surgical procedure, and/or any other visual content as may serve a particular implementation. For example, display monitor 414 may display images of the surgical site together with additional content (e.g., graphical content, contextual information, etc.) concurrently displayed with the images. In some embodiments, display monitor 414 is implemented by a touchscreen display with which surgical team members 410 may interact (e.g., by way of touch gestures) to provide user input to surgical system 400.

Manipulating system 402, user control system 404, and auxiliary system 406 may be communicatively coupled one to another in any suitable manner. For example, as shown in FIG. 4, manipulating system 402, user control system 404, and auxiliary system 406 may be communicatively coupled by way of control lines 416, which may represent any wired or wireless communication link as may serve a particular implementation. To this end, manipulating system 402, user control system 404, and auxiliary system 406 may each include one or more wired or wireless communication interfaces, such as one or more local area network interfaces, Wi-Fi network interfaces, cellular interfaces, etc.

In certain examples, imaging devices such as imaging devices 102 may be attached to components of surgical system 400 and/or components of a surgical facility where surgical system 400 is set up. For example, imaging devices may be attached to components of manipulating system 402. Accordingly, kinematics information for components of manipulating system 402 may be used by system 100 to derive kinematics information for the attached imaging devices after a one-time calibration has been performed to identify relationships between tracked kinematics of components of manipulating system 402 and imaging devices attached to the components of manipulating system 402.

Figure 5:
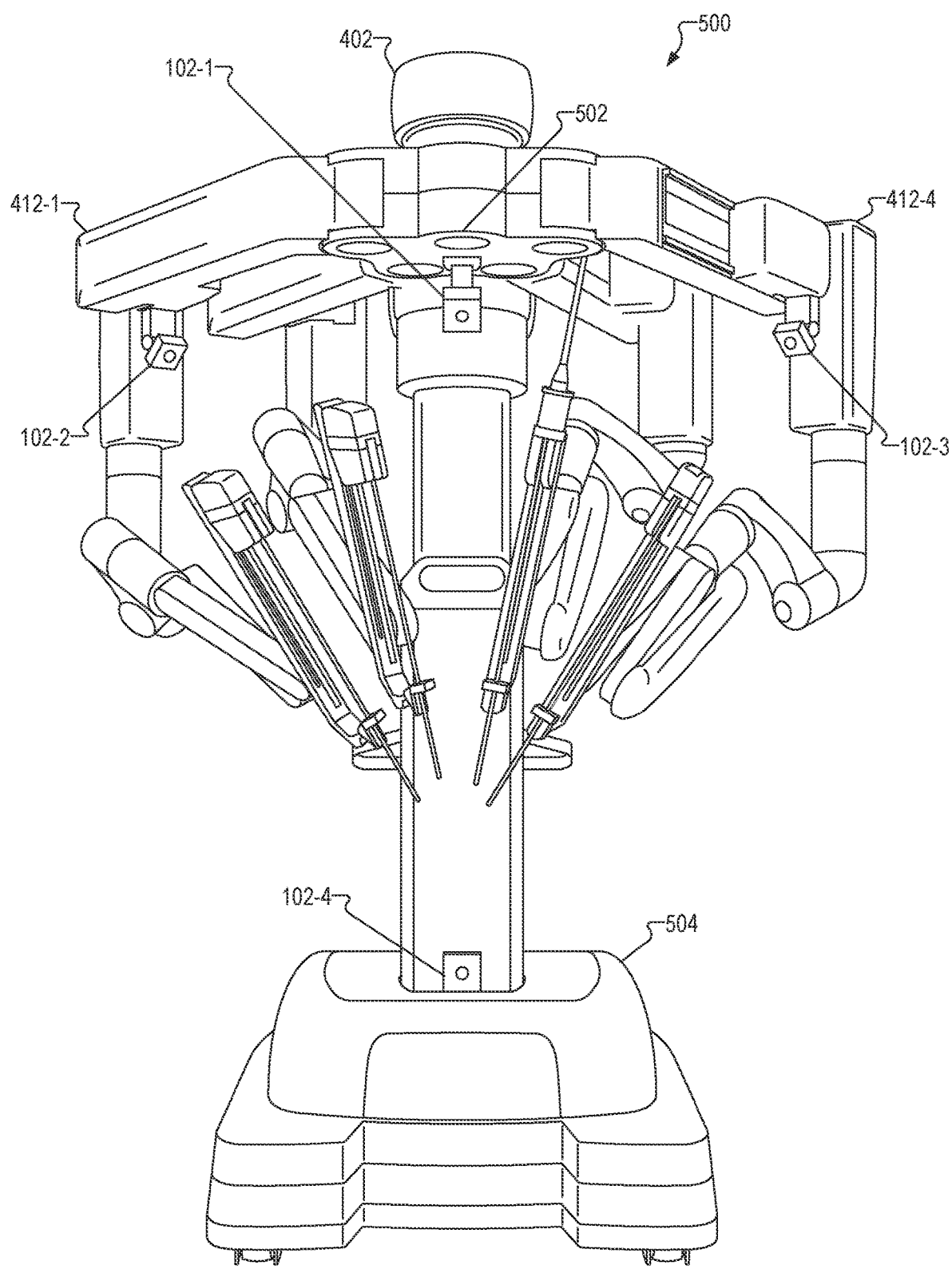
FIG. 5 depicts an illustrative configuration of imaging devices attached to a robotic surgical system according to principles described herein.

FIG. 5 depicts an illustrative configuration 500 of imaging devices 102 (imaging devices 102-1 through 102-4) attached to components of manipulating system 402. As shown, imaging device 102-1 may be attached to an orienting platform (OP) 502 of manipulating system 402, imaging device 102-2 may be attached to manipulating arm 412-1 of manipulating system 402, imaging device 102-3 may be attached to manipulating arm 412-4 of manipulating system 402, and imaging device 102-4 may be attached to a base 504 of manipulating system 402. Imaging device 120-1 attached to OP 502 may be referred to as OP imaging device, imaging device 120-2 attached to manipulating arm 412-1 may be referred to as universal setup manipulator 1 (USM1) imaging device, imaging device 120-3 attached to manipulating arm 412-4 may be referred to as universal setup manipulator 4 (USM4) imaging device, and imaging device 120-4 attached to base 504 may be referred to as BASE imaging device. In implementations in which manipulating system 402 is positioned proximate to a patient (e.g., as a patient side cart), placement of imaging devices 402 at strategic locations on manipulating system 402 provides advantageous imaging viewpoints proximate to a patient and a surgical procedure performed on the patient.

In certain implementations, components of manipulating system 402 (or other robotic systems in other examples) may have redundant degrees of freedom that allow multiple configurations of the components to arrive at the same output position of an end effector attached to the components (e.g., an instrument connected to a manipulator arm 412). Accordingly, processing system 108 may direct components of manipulating system 402 to move without affecting the position of an end effector attached to the components. This may allow for repositioning of components to be performed for scene perception without changing the position of an end effector attached to the components.

The illustrated placements of imaging devices 102 to components of manipulating system 402 are illustrative. Additional and/or alternative placements of any suitable number of imaging devices 102 on manipulating system 402, other components of surgical system 400, and/or other components at a surgical facility may be used in other implementations. Imaging devices 102 may be attached to components of manipulating system 402, other components of surgical system 400, and/or other components at a surgical facility in any suitable way.

A calibration process may be performed to calibrate imaging devices 102 to surgical system 400. The calibration process may be configured to determine spatial relationships between the imaging devices 102 (e.g., viewpoints of the imaging devices 102) and components of surgical system 400. This may result in known or deterministic relationships of component tracking data, such as robotic kinematics data of surgical system 400, to imaging devices 102. The determined spatial relationships may be used to determine spatial information for the imaging devices 102 (e.g., positions, orientations, poses, viewpoints, and/or fields of view of the imaging devices 102 based on spatial information for the components of surgical system 400 (e.g., kinematics data for a kinematics chain of manipulating system 402, vision tracking information, etc.). The calibration of imaging devices 102 to manipulating system 402 may register imaging devices 102 to the kinematic chain of manipulating system 402 and allow data sets captured by imaging devices 102 to be expressed in a common coordinate frame such as the base frame of manipulating system 402.

In certain examples, a one-time calibration process may be performed for imaging devices 102 attached to surgical system 400. The results of the one-time calibration may then be used for other implementations of imaging devices on surgical systems, where the attachments of the imaging devices to the surgical systems are rigid and provide the same spatial relationships between the imaging devices and components of the surgical systems. This provides a scalable solution that does not require a calibration process to be performed for each implementation of imaging devices on a surgical system.

An illustrative calibration process uses a custom calibration fixture that includes four sphere-shaped objects of different colors positioned non-coplanarly. The different colors are used for correspondence. Imaging devices 102 capture images that include the calibration fixture. The images may include intensity images and depth images. A 3D point cloud may be generated from the depth images.

To calibrate the locations of imaging devices 102 based on the images of the calibration fixture, a modified version of a hand-eye calibration pipeline may be used. In this process, manipulating system 402 and the calibration fixture are kept static relative to each other. An imaging device is mounted to manipulating system 402 at a location $C_1$ having an unknown transformation X with respect to a joint of manipulating system 402, with a known forward kinematics $T_1$. To determine the locations of fiducials in the coordinate frame of the imaging device at location $C_1$, a sphere fitting algorithm is used to estimate the centers of the spheres of the calibration fixture, thus approximating the locations of the fiducials. Because the fiducials are static relative to each other, they can define a local coordinate frame. The transformation from the coordinate frame of the imaging device at location $C_1$ to the local frame of the calibration fixture may be denoted as $S_1$. The goal of the calibration process is to determine X using the above information.

The imaging device is then moved to another location $C_2$ by manipulating system 402, with a new forward kinematics $T_2$ and new fiducial locations $S_2$. This configuration and process provides $$T_1 X S_1 = T_2 X S_2$$

$$T_1^{-1} T_2 X = X S_1 S_2^{-1}$$

$$AX = XB \qquad \text{(Equation 1)}$$

where $A = T_1^{-1} T_2$ is the relative movement of the joint, and $B = S_1 S_2^{-1}$ is the inverse relative movement of the fiducials in the imaging device frame, which can be found by a least-squares estimation. Equation 1 is further decomposed into $$R_A R_X = R_X R_B$$

$$R_A t_X + t_A = R_X t_B + t_X$$

which can be expressed as the following form $$\begin{pmatrix} I_{9\times 9} - R_A \otimes R_B & 0_{9\times 3} \\ I_{3\times 3} \otimes t_B^T & I_{3\times 3} - R_A \end{pmatrix} \begin{pmatrix} vec(R_X) \\ t_X \end{pmatrix} = \begin{pmatrix} 0_{9\times 1} \\ t_A \end{pmatrix} \quad \text{(Equation 2)}$$

where I refers to the identity matrix and $R_A$, $R_B$, and $t_A$, $t_B$ refer to the rotation and translation component of the transformation A, B respectively. The symbol $\otimes$ refers to the Kronecker product, and the vec symbol refers to the row major flattening of a matrix. In order to solve Equation 1, all six degree of freedom (DoF) movements are covered when collecting relative motions of A and B. Rotations of manipulating system 402 may be limited to a rotation around a vertical axis (an axis orthogonal to the plane of the floor on which manipulating system 402 is deployed), which axis may be referred to as the Z-axis. The rotation $R_X$ may be determined, while only partial of the translation as $$tx(\alpha) = t^\perp + \alpha n_z \quad \text{(Equation 3)}$$

where $n_z$ is the rotation axis (Z-axis of manipulating system 402), $t^\perp$ is the translation along the plane with normal being $n_z$, and $\alpha$ is any scalar. Therefore, the location of the OP, USM1, and USM4 imaging devices can be calibrated, with a missing translation along the Z-axis of manipulating system 402.

Because BASE imaging device is static relative to base 504 of manipulating system 402, the calibration process described above does not apply. To calibrate the transformation from base 504 of manipulating system 402 to the BASE imaging device, a different approach is applied. By using the calibration result of OP $X_O P$ from the previous step, the transformation from manipulating system 402 to fixture T(fixture, robot) can be expressed by $$T_{robot}^{fixture} = X_{base} S_{base} = T_{op} X S_{op}$$

$$X_{base} = T_{op} X S_{op} S_{base}^{-1},$$

where $X_{base}$ is the target unknown BASE imaging device calibration, $T_{OP}$ is from the manipulating system 402 kinematics, and $S_{base} S_{OP}^{-1}$ can be estimated through least squares. The error can be minimized by collecting several sets of data.

To solve for the last degree of freedom, an iterative closest point (ICP) procedure is followed by using auxiliary system 406 (which may be referred to as a vision side cart) as a calibration fixture. The previous calibration result serves as a warm start for the ICP algorithm.

After BASE imaging device is calibrated using the above calibration process, the results of the calibration may be used in identical configurations of imaging devices and manipulating system 402 because the mounting locations for the imaging devices are deterministic.

After setup and registration of perception system 100 with surgical system 400, perception system 100 may operate in any of the ways described herein to generate perception data for a surgical scene proximate to surgical system 400. The operation may include processing system 108 fusing data sets corresponding to imaging devices 102 in any of the ways described herein, such as by fusing data sets to a coordinate frame of manipulating system 402. In certain examples, the fused data sets may form a fused segmentation data set that indicates scene perception data in the form of semantic segmentation data for the surgical scene. In other examples, the fused data sets may be provided as input to a scene segmentation process that generates a fused segmentation data set that indicates scene perception data in the form of semantic segmentation data for the surgical scene.

In certain examples, processing system 108 may be configured to perform a novel multi-view semantics segmentation fusion algorithm, which shares the confidence of data sets for the different imaging devices 102 via a data-driven approach. An example of such an algorithm will now be described.

Processing system 108 may subject image data sets corresponding to imaging devices 102 to individual segmentation processes that generate segmentation data sets for respective imaging devices 102. The segmentation data sets may include potential classifications of image data points and confidence scores assigned to the potential classifications of image data points. The confidence scores may represent levels of confidence in potential classifications. In certain examples, confidence scores for a data point may be provided for each of the classes that may be potentially assigned to the data point. Potential classes may include an operating room (OR) table class, a manipulating system 402 class (which may be referred to as a patient side cart (PSC) class), an auxiliary system 406 class (which may be referred to as a vision side cart (VSC) class), a human class, a ceiling light class, a medical stand class (e.g., a class for an instrument tray stand such as a MAYO stand), a table class, and an anesthesia cart class. This example set of classes is illustrative. Other sets of classes may be used in other examples.

Confidence scores may be represented as probability tensors in certain examples. For example, in an implementation in which four imaging devices 102 are used, processing system 108 may output four probability tensors for a frame set of images (one tensor for each imaging device), and each tensor may have a size equal to the resolution of an image multiplied by a number of potential classes.

Because the surgical scene is observed by multiple imaging devices 102, processing system 108 may be configured to share confidence scores between imaging devices 102, such as by sharing the probability tensors between imaging devices 102. The sharing may be performed using a novel multi-view projection and merging (MVPM) technique. The MVPM technique can enhance pixel-to-pixel relationships, provide region smoothing, and/or improve predictions of hard-to-segment objects by combining confidences of different views in a per-class manner.

An example of processing system 108 performing an illustrative MVPM technique will now be described in relation to the OP imaging device 102-1 in configuration 500 of FIG. 5. By using the relative transformation between the OP imaging device 102-1 and the other imaging devices 102-2, 102-3, and 102-4 in configuration 500, as well as the intrinsic parameters of the OP imaging device 102-1, the probabilities from the other imaging devices 102-2, 102-3, and 102-4 can be projected to the OP imaging device 102-1 plane, resulting in three times more 2D probability tensors with pixel correspondence. For configuration 500, this operation quadruples the information of the OP imaging device 102-1. Depth image data may also be projected to approximate a conditional random fields (CRF) algorithm and to attempt to resolve line-of-sight issues.

After the projection operation, the probability and depth values are sorted such that the confidence and depth values of the OP imaging device 102-1 are always in the first C+1 channels. Data sets for the other imaging devices 102-2, 102-3, and 102-4 may be sorted in the following order: imaging device 102-2 (USM1 imaging device), imaging device 102-3 (USM4 imaging device), and imaging device 102-4 (BASE imaging device). This sorting allows a merge process to receive non-stochastic data from the imaging devices.

The merge process may include processing system 108 using a suitable encoding-decoding shape to combine channels for the four imaging devices and the set of potential classes into a set of channels equal in number to the potential classes in the set (e.g., by combining 4×(C+1) into C channels). The output set of channels represents the probabilities in the different classes. Processing system 108 may then convert the low-level embeddings of the probabilities of each image to a segmentation map by taking the maximum probability. In certain examples, processing system 108 may perform the merge process based on only the probabilities and without knowledge of the input images. This may allow a merge module to be trained individually from a segmentation module and generalized to other data as long as segmentation provides reasonable predictions.

In this manner, processing system 108 may generate and output a prediction for the OP imaging device 102-1 (e.g., segmentation of an image captured by the OP imaging device 102-1), which prediction is based on confidence scores for predictions for all four imaging devices 102-1 through 102-4. Processing system 108 may perform the process for each of imaging devices 102 and output such a prediction for each of imaging devices 102. Accordingly, confidences for segmentations of images captured by the four imaging devices 102 are shared between the imaging devices 102 and used by processing system 108 to improve the perception of the images. Evaluations of semantics segmentation indicate that the MVPM process improves the prediction of objects compared to conventional segmentation techniques.

Figure 6:
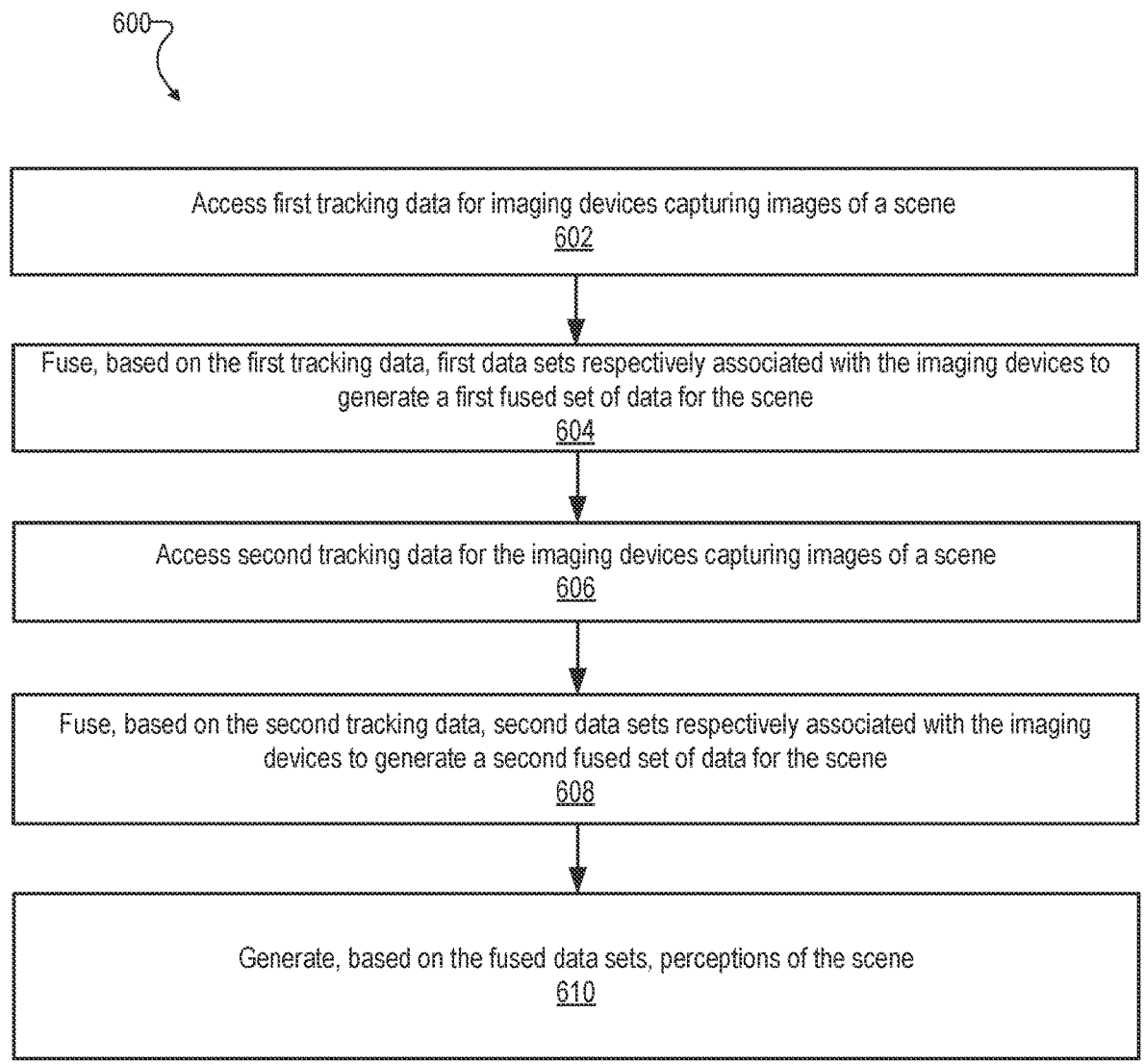
FIGS. 6-7 depict illustrative methods according to principles described herein.

FIG. 6 illustrates an exemplary method 600 of scene perception. While FIG. 6 illustrates exemplary operations according to one embodiment, other embodiments may omit, add to, reorder, combine, and/or modify any of the operations shown in FIG. 6. One or more of the operations shown in in FIG. 6 may be performed by a scene perception system such as system 100, any components included therein, and/or any implementation thereof.

In operation 602, a scene perception system may access first tracking data for imaging devices capturing images of a scene. Operation 602 may be performed in any of the ways described herein.

In operation 604, the scene perception system may fuse, based on the first tracking data, first data sets respectively associated with the imaging devices to generate a first fused set of data for the scene. Operation 606 may be performed in any of the ways described herein.

In operation 606, the scene perception system may access second tracking data for the imaging devices capturing images of a scene. The second tracking data may indicate a change in a pose of at least one of the image devices that occurs while the imaging devices capture images of the scene. Operation 606 may be performed in any of the ways described herein.

In operation 608, the scene perception system may fuse, based on the second tracking data, second data sets respectively associated with the imaging devices to generate a second fused set of data for the scene. Operation 608 may be performed in any of the ways described herein.

In certain implementations, the fused sets of data may be fused segmentations of the scene, which fused segmentations may be considered perceptions of the scene. In other implementations, the fused sets of data may be used to generate perceptions of the scene such as fused segmentations of the scene. In the latter case, method 600 may include operation 610 in which the scene perception system may generate, based on each fused set of data, a scene perception such as a fused segmentation of the scene imaged by the imaging devices. Operation 610 may be performed in any of the ways described herein.

Method 600 may be repeated by the scene perception system to automatically, dynamically, and continually perceive a scene in real time even as imaging devices dynamically move as the scene is being perceived by the scene perception system. For example, operations 602, 604, and optionally 610 of method 600 may be performed for a temporally-associated set of frames captured by the imaging devices, and operations 606, 608, and optionally 610 of method 600 may be performed for a subsequent temporally-associated set of frames captured by the imaging devices. Method 600 may be repeated for other temporally-associated sets of frames captured by the imaging devices.

Figure 7:
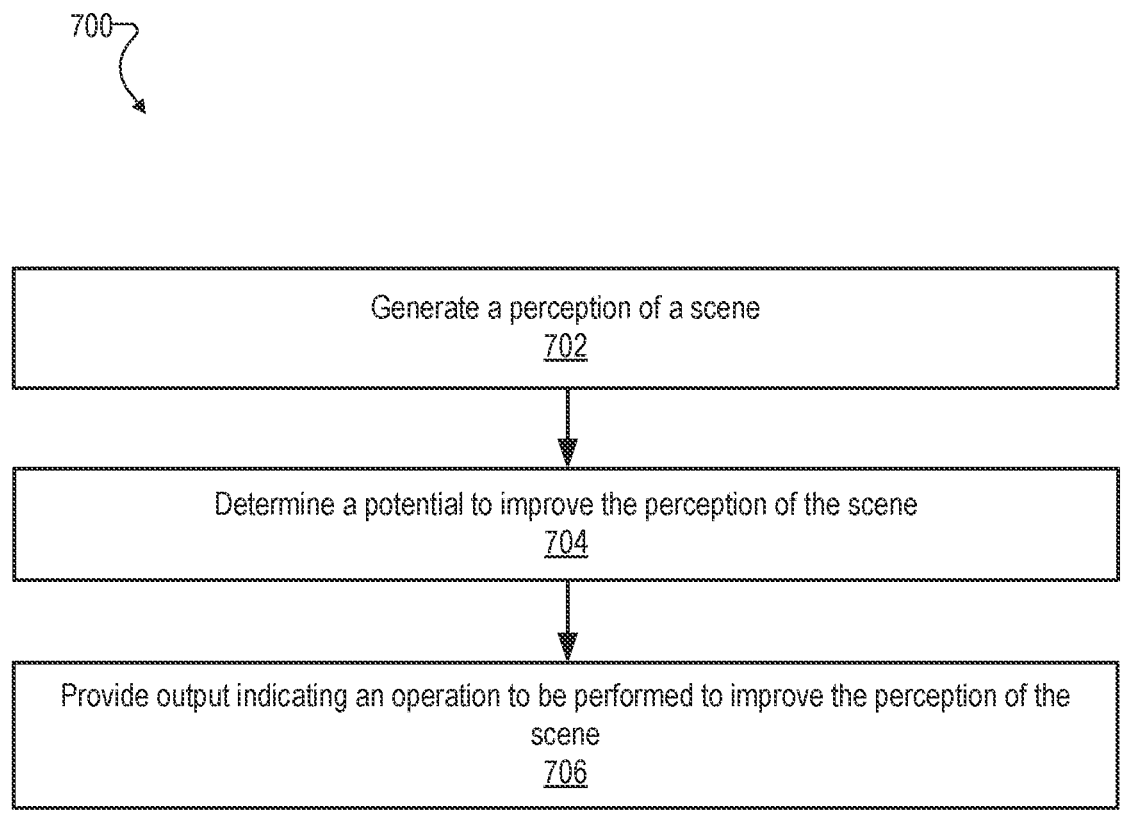

FIG. 7 illustrates an exemplary method 700 of scene perception. While FIG. 7 illustrates exemplary operations according to one embodiment, other embodiments may omit, add to, reorder, combine, and/or modify any of the operations shown in FIG. 7. One or more of the operations shown in in FIG. 7 may be performed by a scene perception system such as system 100, any components included therein, and/or any implementation thereof.

In operation 702, a scene perception system generates a perception of a scene. Operation 702 may be performed in any of the ways described herein. In certain examples, operation 702 may be performed by performing one or more of the operations of method 600.

In operation 704, the scene perception system determines a potential to improve the perception of the scene. Operation 704 may be performed in any of the ways described herein.

In operation 706, the scene perception system provides output indicating an operation to be performed to improve the perception of the scene. Operation 706 may be performed in any of the ways described herein, including by the scene perception system providing the output to one or more imaging devices, to a robotic system associated with the scene perception system (e.g., one or more components of a robotic surgical system), and/or to one or more components of a surgical facility associated with the scene perception system. The output may be configured to direct any suitable device or devices to perform the operation. The operation may be configured to improve perception of the scene in any suitable way, such as by dynamically moving a pose, viewpoint, and/or field of view of an imaging device, moving a viewpoint-obstructing object out of the way of an imaging device, adjusting a setting of an imaging device (e.g., changing a zoom setting), etc.

Method 700 may continue from operation 706 to operation 702 to form a feedback control loop configured to automatically, dynamically, and continually optimize perception of a scene in real time as the scene is being perceived by the scene perception system.

In certain examples, method 700 may be performed in conjunction with method 600. For example, method 700 may be performed to optimize scene perception from a temporally-aligned set of frames corresponding to one point in time to a subsequent temporally-aligned set of frames corresponding to a subsequent point in time.

Scene perception principles, systems, and methods described herein may be used in various applications. As an example, one or more of the scene perception aspects described herein may be used for recognition of objects and activity in a medical facility where a medical system is deployed, such as a surgical facility where a surgical system is deployed. As another example, one or more of the scene perception aspects described herein may be used to obtain or improve context awareness for a surgical procedure. As another example, one or more of the scene perception aspects described herein may be used for surgical workflow analysis in real time or retrospectively. As another example, one or more of the scene perception aspects described herein may be used for automated transcription of a surgical procedure (e.g., for purposes of documentation, further planning, and/or resource allocation). As another example, one or more of the scene perception aspects described herein may be used for automation of surgical sub-tasks. As another example, one or more of the scene perception aspects described herein may be used for computer-assisted setup of a surgical system and/or a surgical facility (e.g., one or more operations to set up a robotic surgical system may be automated based on perception of a surgical scene and automated movement of the robotic surgical system). These examples of applications of scene perception principles, systems, and methods described herein are illustrative. Scene perception principles, systems, and methods described herein may be implemented for other suitable applications.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 8:
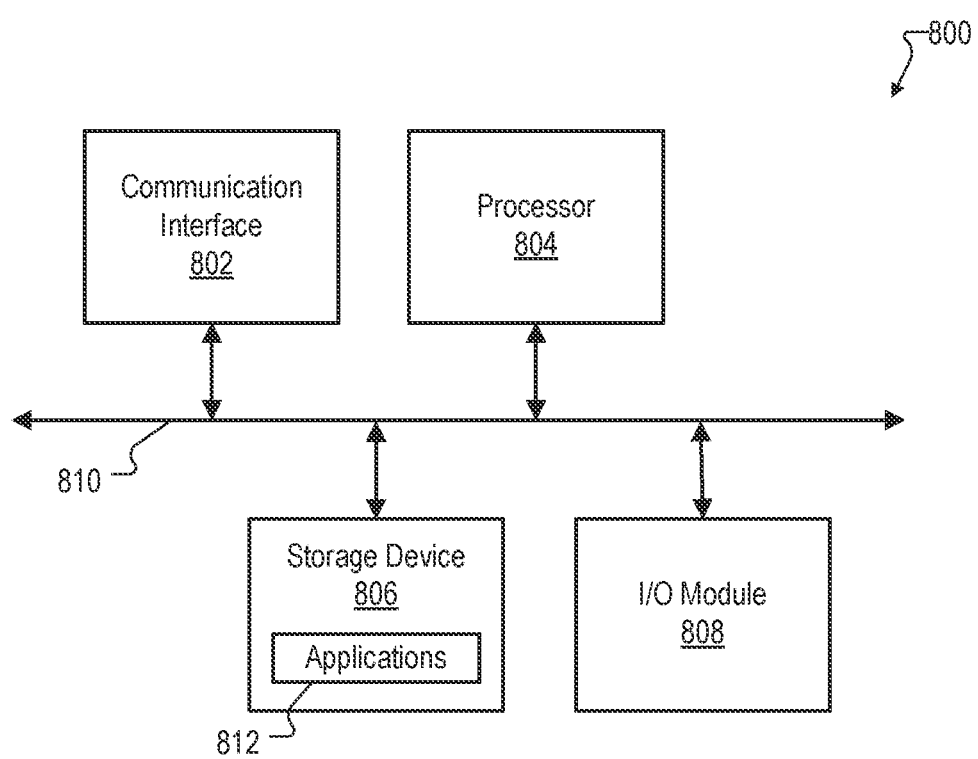
FIG. 8 depicts an illustrative computing device according to principles described herein.

FIG. 8 illustrates an exemplary computing device 800 that may be specifically configured to perform one or more of the processes described herein. Any of the systems, units, computing devices, and/or other components described herein may implement or be implemented by computing device 800.

As shown in FIG. 8, computing device 800 may include a communication interface 802, a processor 804, a storage device 806, and an input/output ("I/O") module 808 communicatively connected one to another via a communication infrastructure 810. While an exemplary computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, an audio/video connection, and any other suitable interface.

Processor 804 generally represents any type or form of processing unit capable of processing data and/or interpreting, executing, and/or directing execution of one or more of the instructions, processes, and/or operations described herein. Processor 804 may perform operations by executing computer-executable instructions 812 (e.g., an application, software, code, and/or other executable data instance) stored in storage device 806.

Storage device 806 may include one or more data storage media, devices, or configurations and may employ any type, form, and combination of data storage media and/or device. For example, storage device 806 may include, but is not limited to, any combination of the non-volatile media and/or volatile media described herein. Electronic data, including data described herein, may be temporarily and/or permanently stored in storage device 806. For example, data representative of computer-executable instructions 812 configured to direct processor 804 to perform any of the operations described herein may be stored within storage device 806. In some examples, data may be arranged in one or more databases residing within storage device 806.

I/O module 808 may include one or more I/O modules configured to receive user input and provide user output. I/O module 808 may include any hardware, firmware, software, or combination thereof supportive of input and output capabilities. For example, I/O module 808 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the systems, modules, and/or facilities described herein may be implemented by or within one or more components of computing device 800. For example, one or more applications 812 residing within storage device 806 may be configured to direct an implementation of processor 804 to perform one or more operations or functions associated with processing system 108 of system 100.

As mentioned, one or more operations described herein may be performed dynamically and/or in real time. As used herein, operations that are described as occurring "in real time" will be understood to be performed immediately and without undue delay, even if it is not possible for there to be absolutely zero delay. Operations that are described as being performed "dynamically" will be understood to be performed while scene capture and/or scene perception operations are being performed.

Any of the systems, devices, and/or components thereof may be implemented in any suitable combination or sub-combination. For example, any of the systems, devices, and/or components thereof may be implemented as an apparatus configured to perform one or more of the operations described herein.

In the description herein, various exemplary embodiments have been described. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. An apparatus comprising:
a memory storing instructions; and
a processor communicatively coupled to the memory and configured to execute the instructions to:
access first tracking data for imaging devices capturing images from different viewpoints of a scene at a first point in time, the first tracking data indicating first poses of the imaging devices, the imaging devices of a same imaging modality;
fuse, based on the first tracking data, first data sets respectively associated with the imaging devices to generate a first fused set of data for the scene, the first fused set of data corresponding to the first point in time;
access second tracking data for the imaging devices capturing images from different viewpoints of the scene at a second point in time, the second tracking data indicating second poses of the imaging devices and representing a change in a pose of at least one of the image devices that occurs while the imaging devices capture images of the scene;
fuse, based on the second tracking data, second data sets respectively associated with the imaging devices to generate a second fused set of data for the scene, the second fused set of data corresponding to the second point in time; and
generate, based on the first fused set of data, a perception of the scene.

2. The apparatus of claim 1, wherein the imaging devices are visible light imaging devices.

3. The apparatus of claim 1, wherein the imaging devices have same intrinsic parameters.

4. The apparatus of claim 1, wherein:
the first and second data sets respectively associated with the imaging devices comprise first and second segmentation data sets respectively associated with the imaging devices;
the fusing of the first data sets to generate the first fused set of data comprises fusing the first segmentation data sets to form a first fused set of segmentation data; and
the fusing of the second data sets to generate the second fused set of data comprises fusing the second segmentation data sets to form a second fused set of segmentation data.

5. The apparatus of claim 1, wherein:
the first and second data sets respectively associated with the imaging devices comprise first and second image data sets respectively associated with the imaging devices;
the fusing of the first data sets to generate the first fused set of data comprises stitching a first set of images of the scene together along non-overlapping boundaries; and
the fusing of the second data sets to generate the second fused set of data comprises stitching a second set of images of the scene together along non-overlapping boundaries.

6. The apparatus of claim 1, wherein at least one of the imaging devices is mounted to an articulating component of a robotic system.

7. The apparatus of claim 1, wherein at least one of the imaging devices is mounted to an articulating support structure in a surgical facility.

8. The apparatus of claim 1, wherein:
the instructions comprise a machine learned algorithm; and
the processor is configured to apply the machine learned algorithm to perform the fusing of the first data sets to generate the first fused set of data and the fusing of the second data sets to generate the second fused set of data.

9. The apparatus of claim 1, wherein the processor is further configured to execute the instructions to:
determine a potential to improve the perception of the scene; and
provide output indicating an operation to be performed to improve the perception of the scene.

10. The apparatus of claim 9, wherein the processor provides the output to a robotic system to instruct the robotic system to change the pose of at least one of the imaging devices.

11. The apparatus of claim 1, wherein the fusing of the first data sets comprises:
segmenting each of the first data sets; and
combining confidences of the segmentations of the first data sets to generate the first fused set of data for the scene.

12. The apparatus of claim 11, wherein the combining confidences of the segmentations comprises projecting confidences of one of the first data sets onto another of the first data sets.

13. A system comprising:
a first imaging device;
a second imaging device of a same imaging modality as the first imaging device and having a dynamic relationship with the first imaging device based at least on the second imaging device being dynamically moveable relative to the first imaging device during imaging of a scene by the first and second imaging devices; and
a processing system communicatively coupled to the imaging devices and configured to:
access first tracking data for the first and second imaging devices during the imaging of the scene by the first and second imaging devices from different viewpoints of the scene at a first point in time, the first tracking data indicating first poses of the first and second imaging devices;
fuse, based on the first tracking data, first data sets respectively associated with the first and second imaging devices to generate a first fused set of data for the scene, the first fused set of data corresponding to a first point in time;
access second tracking data for the first and second imaging devices during the imaging of the scene by the first and second imaging devices from different viewpoints of the scene at a second point in time, the second tracking data indicating second poses of the first and second imaging devices and representing a change in a pose of the second image device that occurs during the imaging of the scene by the first and second imaging devices;

fuse, based on the second tracking data, second data sets respectively associated with the first and second imaging devices to generate a second fused set of data for the scene, the second fused set of data corresponding to the second point in time; and generate, based on the first fused set of data, a perception of the scene.

14. The system of claim 13, wherein:

the scene comprises a surgical scene proximate a robotic surgical system;

the first imaging device is mounted on a first component of the robotic surgical system; and the second imaging device is mounted on a second component of the robotic surgical system, the second component configured to articulate.

15. The system of claim 13, wherein:

the scene comprises a surgical scene at a surgical facility;

the first imaging device is mounted on a first component at the surgical facility; and the second imaging device is mounted on a second component at the surgical facility, the second component configured to articulate.

16. The system of claim 13, wherein:

the first imaging device is mounted to a first robotic system; and the second imaging device is mounted to a second robotic system that is separate from the first robotic system.

17. A method comprising:

accessing, by a processing system, first tracking data for imaging devices capturing images from different viewpoints of a scene at a first point in time, the first tracking data indicating first poses of the imaging devices, the imaging devices of a same imaging modality;

fusing, by the processing system based on the first tracking data, first data sets respectively associated with the imaging devices to generate a first fused set of data for the scene, the first fused set of data corresponding to a first point in time;

accessing, by the processing system, second tracking data for the imaging devices capturing images from different viewpoints of the scene at a second point in time, the second tracking data indicating second poses of the imaging devices and representing a change in a pose of at least one of the image devices that occurs while the imaging devices capture images of the scene;

fusing, by the processing system based on the second tracking data, second data sets respectively associated with the imaging devices to generate a second fused set of data for the scene, the second fused set of data corresponding to the second point in time; and generating, based on the first fused set of data, a perception of the scene.

18. The method of claim 17, wherein the imaging devices are visible light imaging devices.

19. The method of claim 17, wherein the fusing of the first data sets comprises:

segmenting each of the first data sets; and combining confidences of the segmentations of the first data sets to generate the first fused set of data for the scene.

20. The method of claim 17, further comprising:

determining, by the processing system, a potential to improve the perception of the scene; and providing, by the processing system, output indicating an operation to be performed to improve the perception of the scene.

* * * * *